United States Patent
Kim et al.

(10) Patent No.: US 6,584,047 B1
(45) Date of Patent: Jun. 24, 2003

(54) PICKUP ACTUATOR

(75) Inventors: Seok-jung Kim, Suwon (KR); Byung-ryul Ryoo, Suwon (KR); Yong-ki Son, Suwon (KR); Yong-hoon Lee, Suwon (KR)

(73) Assignee: Samsung Electronics Co., LTD, Suwon (KR)

( * ) Notice: Subject to any disclaimer, the term of this patent is extended or adjusted under 35 U.S.C. 154(b) by 0 days.

(21) Appl. No.: 09/442,460

(22) Filed: Nov. 18, 1999

(30) Foreign Application Priority Data

Nov. 18, 1998 (KR) .............................. 98-49454

(51) Int. Cl.[7] ................................................ G11B 7/00
(52) U.S. Cl. ................................................ 369/44.14
(58) Field of Search ........................ 369/44.11, 44.14, 369/44.15, 44.16

(56) References Cited

U.S. PATENT DOCUMENTS

| 5,581,533 A | 12/1996 | Fujisawa |
| 5,657,172 A | 8/1997 | Shibata et al. |
| 5,724,337 A | 3/1998 | Kawano et al. |
| 5,748,580 A | * 5/1998 | Matsui .................... 369/44.16 |

FOREIGN PATENT DOCUMENTS

| EP | 0 902 423 | 3/1999 |
| JP | 63-298829 | 12/1988 |
| JP | 04-205927 A | 7/1992 |
| JP | 05-290395 A | 11/1993 |
| JP | 08-147732 A | 6/1996 |
| JP | 09-035298 | 2/1997 |

* cited by examiner

Primary Examiner—Nabil Hindi
(74) Attorney, Agent, or Firm—Burns, Doane, Swecker & Mathis L.L.P.

(57) ABSTRACT

A pickup actuator capable of significantly reducing rolling of the area, including: a pickup base, a lens holder having an objective lens mounted thereon, and lens holder driving means for driving the lens holder in directions for focusing and tracking on the pickup base. The lens holder driving means includes at least one magnet, a yoke for concentrating the magnetic flux of the magnet in the direction of the magnetic flux, and a driving coil having a focusing coil and a pair of tracking coils positioned between the magnet and the yoke. The respective widths of the magnet and the yoke are set at a rate of 1:0.8–1.2. Accordingly, the uniform magnetic flux area of the magnetic flux can be widely distributed in the width's direction of the yoke. Further, the magnet is attached to one side of one yoke while being slightly lowered thereon, so that the center of the magnetic flux of the magnet is downwardly moved from its initial position to a distance corresponding to 4–12% of the height of the magnet, and the center line of the magnetic flux of the magnet and the center line of the focusing coil are aligned with each other, exactly. Further, the width of the magnet and the gap between the pair of tracking coils are set at a rate of 1:0.6–0.9. Accordingly, the portions of the pair of tracking coils intersecting the effective magnetic flux area are positioned in the area where the density of the magnetic flux is low, so that the force in the focusing direction by the tracking coils can be reduced.

12 Claims, 5 Drawing Sheets

DISTRIBUTION OF MAGNETIC FLUX

DISTRIBUTION OF MAGNETIC FLUX

DISTRIBUTION OF MAGNETIC FLUX

PICKUP ACTUATOR

BACKGROUND OF THE INVENTION

1. Field of the Invention

The present invention relates to a pickup actuator of an optical information recording/reproducing apparatus for recording and/or reproducing information on/from a disc by using optical means.

2. Description of the Related Art

The field of optical means for recording/reproducing information by using an optical disc, or the like, is expected to be the most demanded in the future. In such an optical recording/reproducing apparatus a pickup actuator is an important element since it seriously affects the information recording/reproducing speed. The pickup actuator includes a pickup base, a lens holder movably disposed with respect to the pickup base and has an objective lens mounted thereon, and lens holder driving means for moving the lens holder toward the directions for focusing and tracking.

An ordinary example of the pickup actuator is shown in FIG. 1. which will be described in greater detail below.

FIG. 1 is a perspective view of a conventional pickup actuator in which a reference numeral 10 refers to the pickup base. As shown in FIG. 1, the pickup base 10 has a body 12 and a holder support 14. The body 12 has a pair of yokes 20 and 20' of a certain height disposed thereon while keeping a predetermined distance therebetween. Further, the body 12 is attached to the holder support 14 by a plurality of screws 16a and 16b.

Further, a magnet 30 is attached to the inner side of the yoke 20. The magnet 30 forms a magnetic circuit, while the yokes 20 and 20' function to concentrate and maximize the magnetic flux density of the magnet 30 toward the desired direction.

In FIG. 1, the reference numeral 40 refers to the lens holder. The lens holder 40 has the objective lens 42, and is movably suspended to the holder support 14 of the pickup base 10 by two pairs of wire springs 44a and 44b. Further, the lens holder 40 has a driving coil 50, which constitutes the lens holder driving means in cooperation with the magnet 30.

The driving coil 50 has a focusing coil 52 wound in a horizontal relation with the lens holder 40, and a pair of tracking coils 54a and 54b wound in a perpendicular relation with respect to the focusing coil 52. The focusing and tracking coils 52, 54a, and 54b cooperate with the magnet 30 to move the lens holder 40 in the directions for the focusing and tracking.

In such a pickup actuator, the objective lens 42 performs the focusing and tracking operations as the lens holder 40 is moved in the directions for the focusing and tracking by the mutual electromagnetic interaction of the magnet 30 and the focusing and tracking coils 52, 54a, and 54b.

Here, as the objective lens 42 is moved in the directions for focusing and tracking, an undesired rolling in addition to a translational motion occurs, resulting in a degradation of optical signals and thus, causing the inaccurate reading of information or failure to record the information.

It has been known that the main cause of the rolling is due to inconsistency of following three centers, i.e., the center of gravity of the lens holder 40, the center of force of the electromagnetic circuit, and the center of support of the wiring springs 44a and 44b supporting the lens holder 40. In order to lower the possibility of rolling, these three centers are designed to be aligned with each other, to prevent the rolling when the lens holder is moved in the directions for focusing and tracking from its initial position, i.e., the neutral position.

However, when the lens holder 40 is moved in the focusing direction after having been moved in the tracking direction, or vice versa, the inconsistency of the centers of gravity and force may occur, resulting in the rolling.

The above will be described with reference to FIGS. 2 and 3.

FIG. 2 is a view showing the positions of the coils of the lens holder 40 of the conventional pickup actuator relative to the effective area 60 of the magnetic flux distribution when the lens holder 40 is at its initial position, i.e., at the neutral position, and FIG. 3 is a view showing the positions of the coils of the lens holder 40 of the conventional pickup actuator relative to the effective area 60 of the magnetic flux distribution when the lens holder 40 is moved in the focusing direction after having been moved in the tracking direction.

When the lens holder 40 is moved in the focusing direction after having been moved in the tracking direction, the portions of the tracking coils 54a and 54b which intersect the effective area of the magnetic flux distribution 60 in FIG. 2, cause unbalanced focusing directional forces of the lens holder 40 as shown in FIG. 3 (since the lens holder 40 is hidden by the focusing and tracking coils which are attached to the lens holder 40 in the figures, the lens holder 40 would be described referring to the coil area of the figures). As shown in FIG. 3, it is noticeable that a portion area X of the tracking coil 54a intersecting the effective area 60 is smaller than another portion area Y of the tracking coil 54b. This is due to a narrow width B between the tracking coils 54a and 54b. Accordingly, the unbalanced forces of the tracking coils 54a and 54b impedes to reduce the rolling of the pickup actuator.

Further, according to the conventional pickup actuator, since the magnet 30 and the yoke 20 are made to have widths C and A at a rate of 1:0.5–0.8, the width A of the yoke 20 is relatively narrower than the width C of the magnet 30. Accordingly, as shown in FIG. 4, the width of the uniform magnetic flux area is narrowed, again impeding the rolling control of the pickup actuator.

Meanwhile, to solve the above-mentioned problems, there have been several approaches such that the unbalance forces of the tracking coils in the focusing direction are balanced by laying a center line of the coils on a center line of the magnet, and such that the uniform magnetic flux area is expanded by shielding the leakage of magnetic flux using a cover covering the yoke, etc. The approaches, however, have shortcomings in that it can hardly balance the force just by coinciding the center lines of the coils and the magnet. Also, employing the cover to cover the yoke would result in increased number of parts, and thus, it inevitably increases the manufacturing cost.

SUMMARY OF THE INVENTION

The present invention has been developed to overcome the above-mentioned problems of the prior art, and accordingly, it is an object of the present invention to provide a pickup actuator having lower possibility of unbalanced forces of tracking coils in the focusing direction by minimizing the forces in the focusing direction of the tracking coil when the lens holder is moved in the focusing direction after having been moved in the tracking direction so that the rolling of the pickup actuator can be reduced.

Another object of the present invention is to provide a pickup actuator having wider uniform magnetic flux area of an electromagnetic circuit without using a separate part to decrease the rolling thereof.

Yet another object of the present invention is to provide a pickup actuator having a significantly reduced rolling of the area thereof by coinciding the center lines of the focusing coil and the magnetic flux of the magnet.

The above object is accomplished by a pickup actuator, including a pickup base, a lens holder having an objective lens mounted thereon, and lens holder driving means for driving the lens holder on the pickup base in the direction for focusing and tracking. The lens holder driving means includes at least one magnet, a pair of yokes attached to the magnet for concentrating and maximizing the magnetic flux density of the magnet toward the desired direction, and a driving coil having a focusing coil and a pair of tracking coils disposed between the pair of yokes.

Here, the magnet is attached to an inner side of one of the yokes, and the yokes have the same width as the width of the magnet. Accordingly, the uniform magnetic flux area of the magnetic flux can be widely distributed in the width's direction of the electromagnetic circuit.

Further, the magnet is attached to one side of one yoke while being slightly lowered thereon, so that the center line of the magnetic flux of the magnet is aligned with the center line of the focusing coil. More specifically, the magnet is slightly lowered from its initial position to a distance corresponding to 4–12% of the height of the magnet on the yoke. Since the center line of the magnetic flux of the magnet is aligned with the center line of the focusing coils the possibility of unbalanced focusing directional forces by the tracking coils is reduced.

Further, in the pickup actuator according to the present invention, the width between the pair of tracking coils is wider than the conventional ones. Accordingly, the portions of the pair of tracking coils intersecting the effective magnetic flux area are positioned in the area where the density of the magnetic flux is low, so that the focusing directional force by the tracking coils can be reduced, and the possibility of unbalanced forces can be reduced.

In the pickup actuator according to one preferred embodiment of the present invention, the width of the magnet and the width of the yokes are expressed by the proportional expressions of C:A=1.0:0.8–1.2, where the width of the magnet is 'C' and the width of the yokes is 'A'. Here, it is most preferable that the width of the yoke is 1.0.

In the pickup actuator according to another preferred embodiment of the present invention, the gap between the pair of cracking coils and the width of the magnet are expressed by the proportional expression of B:C= 0.6–0.9:1.0, where the gap between the pair of tracking coils is 'B' and the width of the magnet is 'C'. Here, it is the most preferable that the gap B between the tracking coils is 0.75.

In the pickup actuator according to yet another preferred embodiment of the present invention, the magnet attached to one side of one yoke is lowered on the yoke, so that the center line of the magnet is downwardly moved to a distance E corresponding to 4–12% of the height D of the magnet on the yoke.

According to the present invention, the focusing directional force by the tracking coils is reduced, the uniform magnetic flux of the electromagnetic circuit is widely distributed in the width's direction of the electromagnetic circuit, and the center line of the magnetic flux of the magnet and the center line of the focusing coil are exactly aligned with each other, so that the rolling of the pickup actuator can be significantly reduced.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
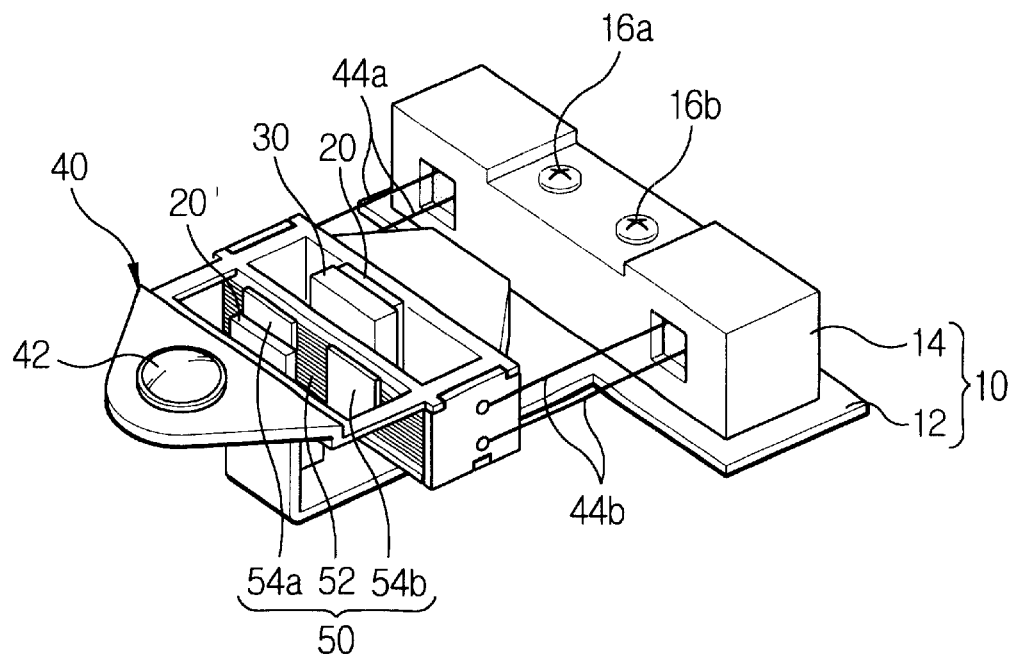
FIG. 1 is a perspective view of a conventional pickup actuator.
Figure 2:
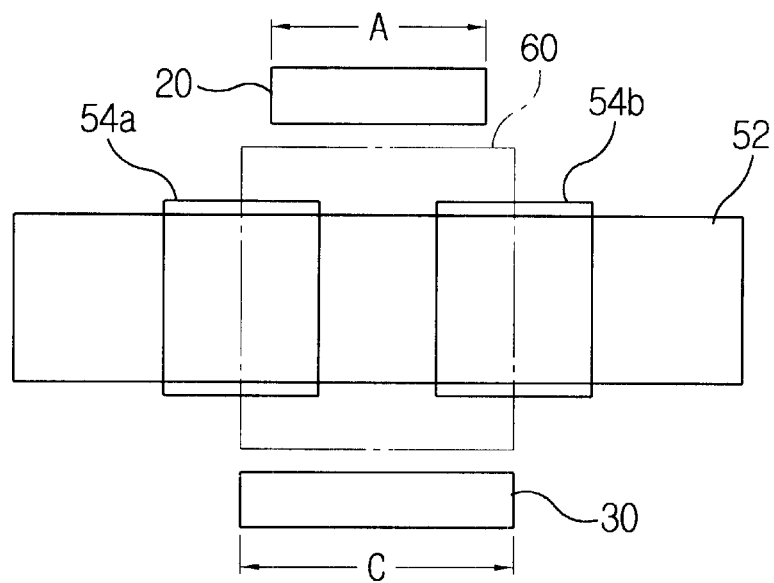
FIG. 2 is a view showing the position of the driving coil in the effective area of the magnetic flux when a conventional pickup actuator is at its the neutral position.
Figure 3:
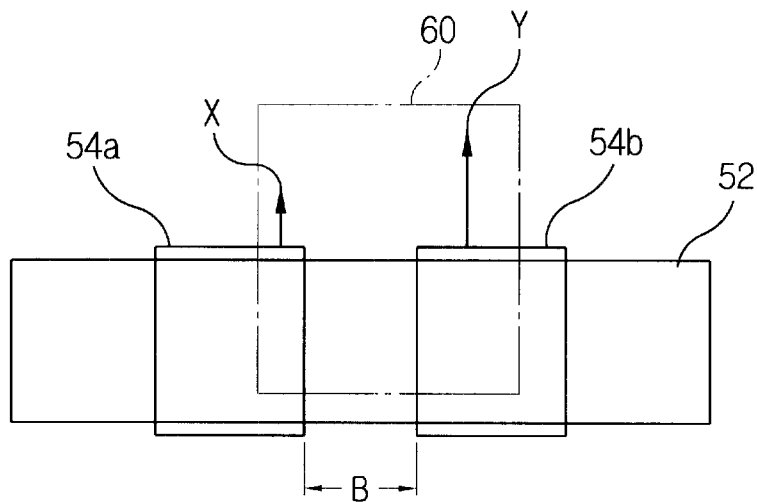
FIG. 3 is a view showing the position of the driving coil in the effective area of the magnetic flux when the lens holder is moved in the focusing direction after having been moved in the tracking direction.
Figure 4:
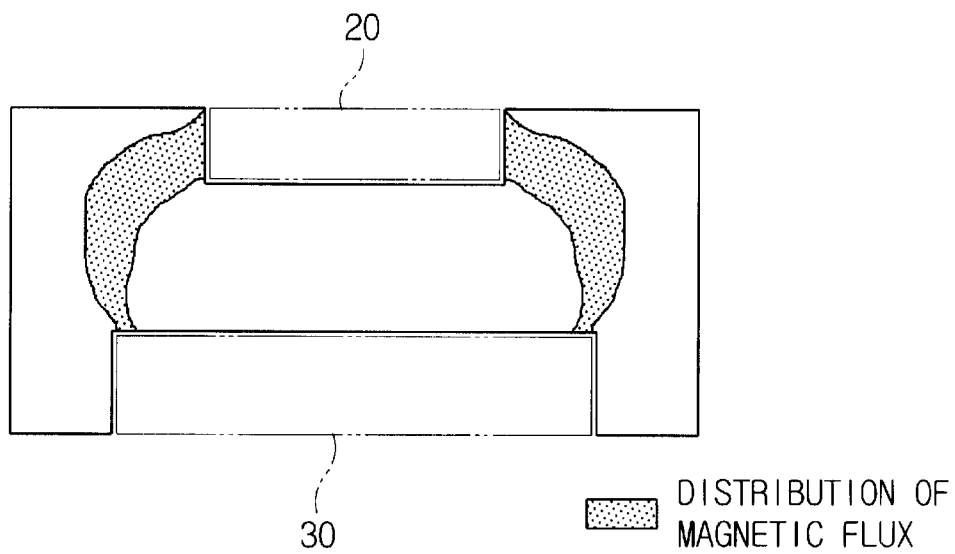
FIG. 4 is a view for showing the distribution of the magnetic flux of a conventional pickup actuator.

Reference will now be made in detail to the present preferred embodiments of the present invention, examples of which are illustrated in the accompanying drawings, wherein like reference numerals refer to like elements throughout.

Figure 5:
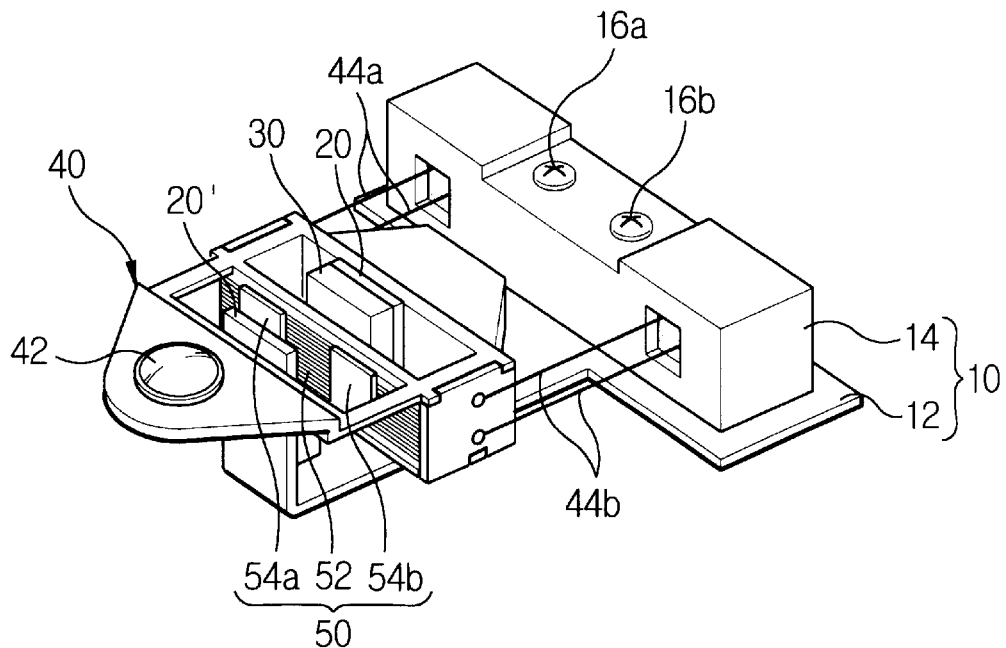
FIG. 5 is a perspective view of a pickup actuator according to a preferred embodiment of the present invention.

FIG. 5 is a perspective view of a pickup actuator according to a preferred embodiment of the present invention. In FIG. 5, the reference numeral 10 refers to a pickup base, 20 and 20' are yokes, 30 is a magnet, 40 is a lens holder, 50 is a driving coil, and 60 is an effective magnetic flux area.

As shown in FIG. 5, the pickup actuator according to the present invention includes a pickup base 10, a lens holder 40 movably disposed on the pickup base 10 and has an objective lens 42 mounted thereon, and lens holder driving means for driving the lens holder 40 in the directions for focusing and tracking.

The pickup base 10 includes a body 12 and a holder support 14. The holder support 14 is attached onto the upper side of the body 12 by a plurality of screws 16a and 16b.

The lens holder 40 is movably suspended to the holder support 14 of the pickup base 10 by two pairs of wire springs 44a and 44b.

The lens holder driving means includes a pair of yokes 20 and 20', at least one magnet 30, and a driving coil 50.

The pair of yokes 20 and 20' stand upright on the body 12 of the pickup base 10, spaced away from each other by a certain distance. The magnet 30 is attached to the inner side of the yokes 20. The magnet 30 forms a magnetic circuit, and the yokes 20 and 20' function to concentrate and maximize the magnetic flux of the magnet 30 toward the direction of the magnetic flux.

The driving coil 50 includes a focusing coil 52 wound around in a parallel relation with the lens holder 40, and tracking coils 54a and 54b wound in a perpendicular relation with the focusing coil 52. The focusing coil 52 and the tracking coils 54a and 54b move the lens holder 40 in the directions for the focusing and tracking in cooperation with the magnet 30.

Meanwhile, according to the feature of the present invention, the widths C and A of the magnet 30 and the yokes 20 and 20' are set at a rate of 1:0.8–1.2. More preferably, the rate of the widths C and A of the magnet 30 and the yokes 20 and 20' are set at the rate of 1:1.

Figure 8:
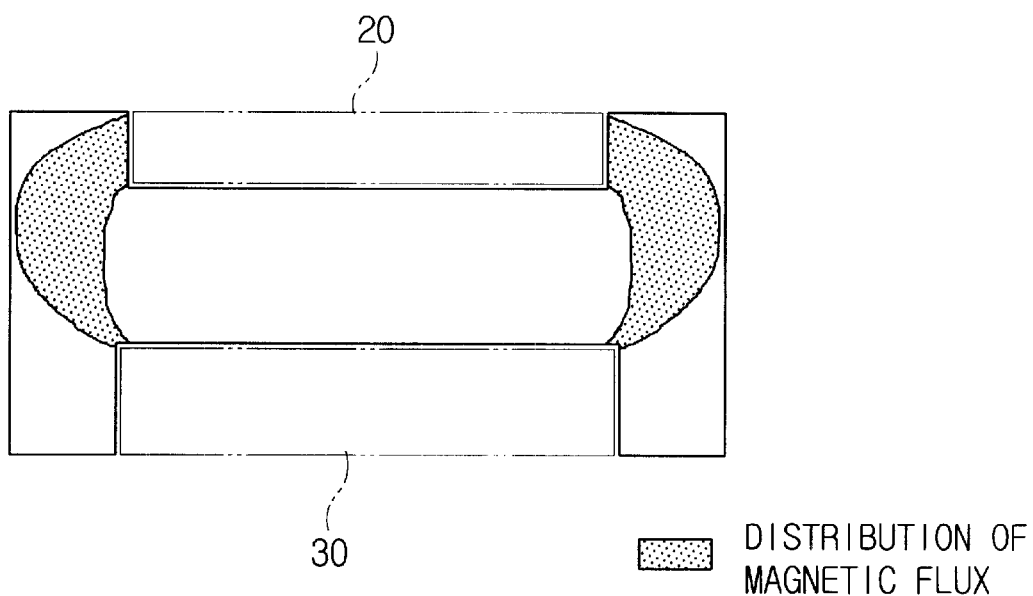
FIG. 8 is a view for showing the distribution of the magnetic flux of the pickup actuator according to a preferred embodiment of the present invention.

Accordingly, as the widths C and A of the magnet 30 and the yokes 20 and 20' are equaled with each other, as shown in FIG. 8, the uniform magnetic flux area of the electromagnetic circuit can be widely distributed in the width's direction of the electromagnetic circuit, and accordingly, the rolling of the pickup actuator can be significantly reduced. More specifically, when the lens holder 40 is moved in the focusing direction after having been moved in the tracking direction, since the uniform magnetic flux area is widely distributed in the width's direction, the density differences between the magnetic flux of the respective positions are reduced so that the rolling of the pickup actuator can be reduced.

Figure 6:
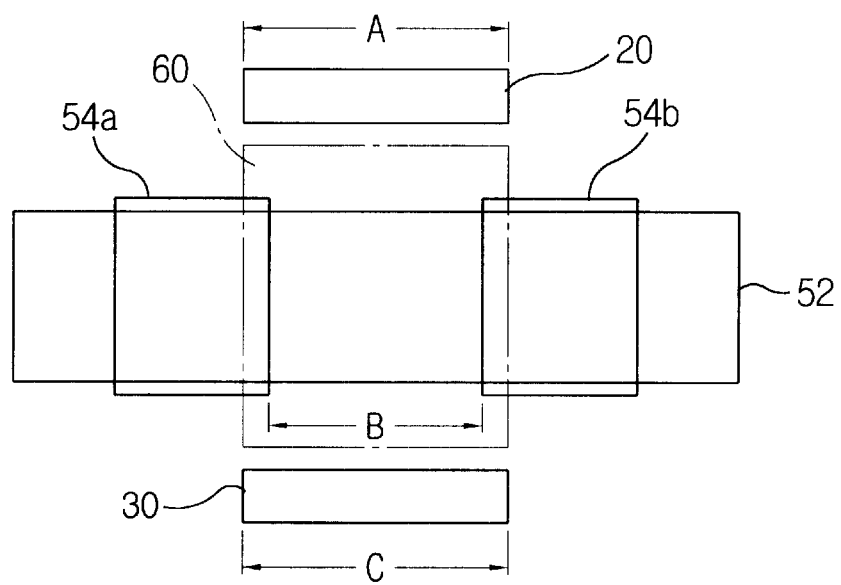
FIG. 6 is a view of the pickup actuator of FIG. 5, horizontally showing the magnetic circuit.

Another feature of the present invention is shown in FIG. 6. in which the portions of tracking coils 54a and 54b intersecting the effective area of the distribution of the magnetic flux are positioned in the area where the density of the magnetic flux is low for this purpose, the gap B between the tracking coils 54a and 54b is widened to substantially correspond with the width of the magnet 30. More specifically, the width C of the magnet 30, And the gap B between the tracking coils 54a and 54b are set at a rate of 1:0.6–0.9. Accordingly, the focusing directional force of the tracking coils 54a and 54b is reduced. Here, the width C of the magnet 30 and the gap B between the tracking coils 54a and 54b are preferably set at the rate of 1:0.75.

Additionally, the intersecting portions of the tracking coils 54a and 54b may cause the focusing directional force when the lens holder 40 is moved in the focusing direction after having been moved in the tracking direction. However, as shown in FIG. 6, since the intersecting portions of the tracking coils 54a and 54b are positioned in the area where the density of the magnetic flux is low, by the width difference between the intersecting portions of the tracking coils 54a and 54b and the magnet 30, the possibility of unbalanced force is relatively reduced, and the rolling of the pickup actuator is reduced.

Figure 7:
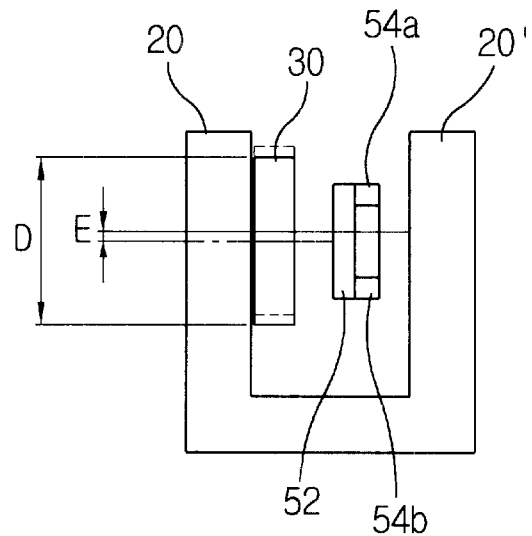
FIG. 7 is a view of the pickup actuator of FIG. 5, vertically showing the magnetic circuit.

Referring to FIG. 7, another feature of the present invention is shown, in which the center line of the magnetic flux of the magnet 30, and the center line of the focusing coil 52 are aligned with each other, thereby reducing the rolling of the pickup actuator.

Figure 9:
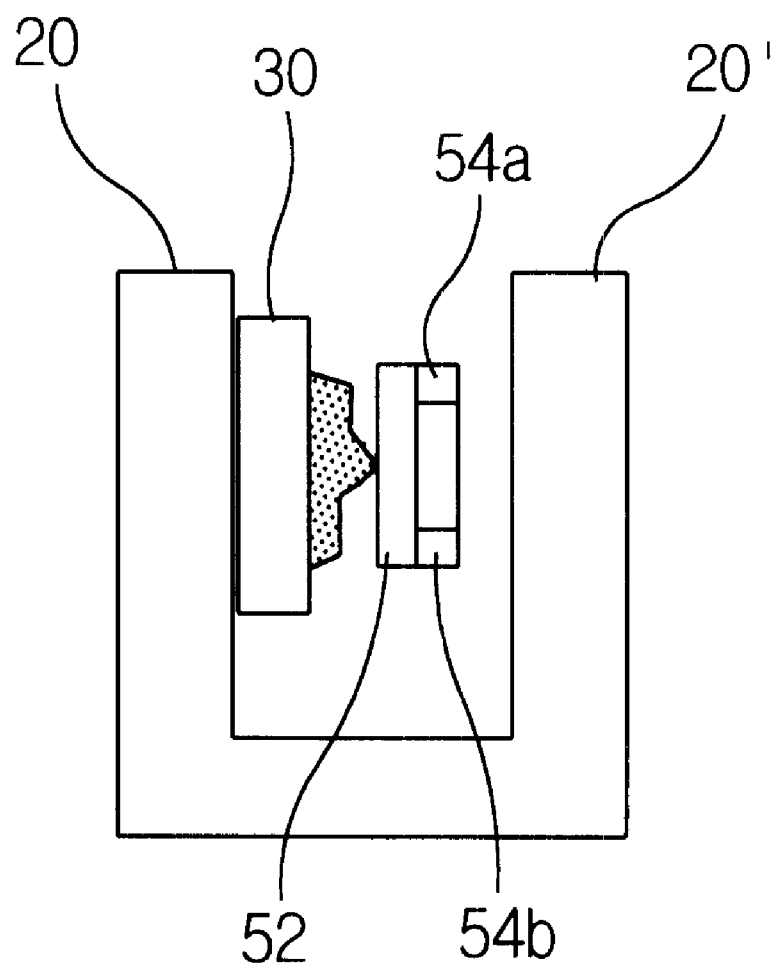
FIG. 9 is a view for vertically showing one example of the distribution of the magnetic flux of the pickup actuator according to a preferred embodiment of the present invention.
Figure 9:

Additionally, as shown in FIG. 7, the magnet 30 is attached onto the yoke 20 while being slightly lowered. Here, the dotted line of FIG. 7 indicates the previous position of the magnet 30 and the solid line indicates the final position of the magnet 30 which has been lowered. Here, the distance that the magnet 30 is lowered corresponds to 4–12% of the height D of the magnet 30. By doing so, the center line of the magnetic flux is aligned with the center line of the focusing coil, exactly. FIG. 9 vertically shows the distribution of the magnetic flux after the center transition. As shown in FIG. 9, the center line of the magnetic flux of the magnet 30, and the center line of the focusing coil are aligned with each other, exactly.

In the pickup actuator constructed as above according to the present invention, the lens holder 40 is moved in the directions for focusing and tracking by the mutual electromagnetic interaction of the magnet 30, the focusing coil 52, and the tracking coils 54a and 54b, performing the focusing and tracking operations of the objective lens 42.

In such a situation, in addition to the normal translational motion of the objective lens 42, the undesired rolling occurs due to the reasons described above. However, by the feature of the present invention, the rolling is reduced significantly, and accordingly, errors in recording and/or reproducing the information which have been caused due to excessive rolling, are reduced, significantly.

As described above, according to the present invention, the focusing directional force by the tracking coils is reduced, the uniform area of the magnetic flux is distributed in the width's direction of the yokes, and the center line of the magnetic flux, and the center line of the focusing coil are aligned with each other, exactly, so that the pickup actuator is enabled to reduce the rolling of the area, significantly.

Although the preferred embodiment of the present invention has been shown and described, it will be appreciated by those skilled in the art that changes may be made in these embodiments without departing from the principles and spirit of the invention, the scope of which is defined in the claims and their equivalents.

What is claimed is:

1. A pickup actuator comprising:

a pickup base;

a lens holder movably disposed on the pickup base, the lens holder having an objective lens mounted thereon;

a pair of yokes standing upright on the pickup base, spaced away from each other at a predetermined distance;

a magnet attached to an inner side of one of the yokes; and a focusing coil and a pair of tracking coils constituting an electromagnetic circuit in cooperation with the magnet and the yokes for driving the lens holder in the directions for focusing and tracking, and a width C of the magnet and a gap B between the pair of tracking coils are set at a rate of 1:0.6–0.9.

2. The pickup actuator as claimed in claim 1, wherein the width C of the magnet and the gap B between the pair of tracking coils are set at a rate of 1:0.75.

3. The pickup actuator as claimed in claim 1, wherein the focusing coil and the tracking coils are wound in the lens holder in a perpendicular relation with each other.

4. A pickup actuator comprising:

a pickup base;

a lens holder movably disposed on the pickup base, the lens holder having an objective lens mounted thereon;

a pair of yokes standing upright on the pickup base, spaced away from each other at a predetermined distance;

a magnet attached to an inner side of one of the yokes; and a focusing coil and a pair of tracking coils constituting an electromagnetic circuit in cooperation with the magnet and the yokes for driving the lens holder in the directions for focusing and tracking, and the magnet is lowered on one of the yokes so that the center of the magnet is downwardly moved from its initial position to a distance corresponding to 4–12% of the height of the magnet.

5. A pickup actuator comprising:

a pickup base;

lens holder movably disposed on the pickup base, the lens holder having an objective lens mounted thereon;

a pair of yokes standing upright on the pickup base, spaced away from each other at a predetermined distance;

a magnet attached to an inner side of one of the yokes; and a focusing coil and a pair of tracking coils constituting an electromagnetic circuit in cooperation with the magnet and the yokes for driving the lens holder in the directions for focusing and tracking, and respective widths C and A of the magnet and the yokes are set at 1:0.8–1.2, and the width C of the magnet and a gap B between the pair of tracking coils are set at a rate of 1:0.6–0.9.

6. The pickup actuator as claimed in claim 5, wherein the widths C and A of the magnet and the yokes are set at a rate of 1:1.

7. The pickup actuator as claimed in claim 5, wherein the width C of the magnet and the gap B between the pair of tracking coils are set at a rate of 1:0.75.

8. The pickup actuator as claimed in claim 5, wherein the focusing coil and the tracking coils are wound in the lens holder in a perpendicular relation with each other.

9. A pickup actuator comprising:

a pickup base;

a lens holder movably disposed on the pickup base, the lens holder having an objective lens mounted thereon;

a pair of yokes standing upright on the pickup base, spaced away from each other at a predetermined distance;

a magnet attached to an inner side of one of the yokes; and a focusing coil and a pair of tracking coils constituting an electromagnetic circuit in cooperation with the magnet and the yokes for driving the lens holder in the direction for focusing and tracking, and respective widths C and A of the magnet and the yokes are set at a rate of 1:0.8–1.2.

the width C of the magnet and a gap B between the pair of tracking coils are set at a rate of 1:0.6–0.9, and the magnet is lowered on one of the yokes, so that the center of the magnet is downwardly moved from its initial position to a distance corresponding to 4–12% of the height of the magnet.

10. The pickup actuator as claimed in claim 9, wherein the respective widths A and C of the yokes and the magnet are set at a rate of 1:1.

11. The pickup actuator as claimed in claim 9, wherein the width C of the magnet and the gap B between the pair of tracking coils are set at a rate of 1:0.75.

12. The pickup actuator as claimed in claim 9, wherein the focusing and tracking coils are wound in the lens holder in a perpendicular relation with each other.

* * * * *